United States Patent [19]

Andronica

[11] Patent Number: 5,788,440
[45] Date of Patent: Aug. 4, 1998

[54] THREADED ADAPTER BUSHING

[76] Inventor: Ronald Andronica, 761 Higbie La., West Islip, N.Y. 11795-1645

[21] Appl. No.: 810,865

[22] Filed: Mar. 5, 1997

[51] Int. Cl.[6] .............................. F16B 35/04; F16B 37/12
[52] U.S. Cl. ........................ 411/178; 411/414; 248/58
[58] Field of Search .................... 411/178, 180, 411/411, 414; 248/58

[56] References Cited

U.S. PATENT DOCUMENTS

| 2,321,378 | 6/1943 | Green ........................ 411/414 |
| 3,160,189 | 12/1964 | Hughes ...................... 411/178 |
| 4,043,239 | 8/1977 | DeFusco ................. 411/178 X |
| 4,275,263 | 6/1981 | Chino ...................... 411/178 X |

FOREIGN PATENT DOCUMENTS

| 2645922 | 10/1990 | France ........................ 411/414 |
| 12222 | 5/1914 | United Kingdom .............. 411/178 |

*Primary Examiner*—Neill R. Wilson
*Attorney, Agent, or Firm*—Norman B. Rainer

[57] ABSTRACT

A bushing adapted to be secured within a circular aperture of a structural channel support member has a head, and a shank portion having an external male machine thread. A centered bore having an internal machine thread penetrates the head and shank portion. The head has a flat inside shoulder adapted to abut against the channel member.

4 Claims, 2 Drawing Sheets

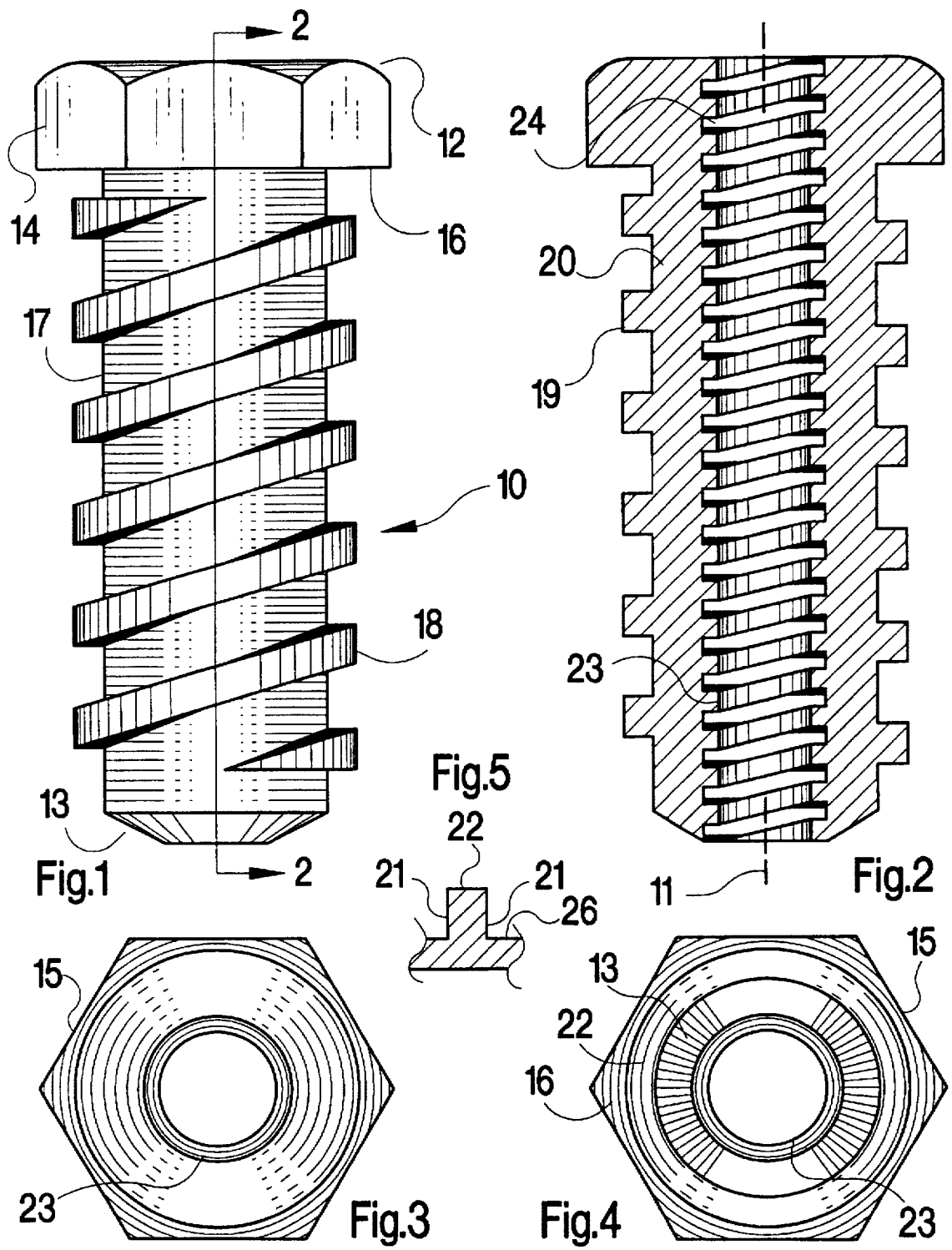

THREADED ADAPTER BUSHING

BACKGROUND OF THE INVENTION

1. Field of the Invention

This invention relates to fasteners, and more particularly concerns an internally and externally threaded bushing adapted to be secured within circular aperture of a structural channel support member. The fastener disposes a bore having internal machine threads within the aperture, thereby permitting threaded attachment of various electrical or structural components thereto.

2. Description of the Prior Art

In plumbing and electrical construction, load bearing structures which support multiple parallel runs of pipes, conduits and equipment are generally fabricated from elongate structural channel elements. These channels may be suspended from ceilings by threaded rods, bolted to walls or other structures, or secured to sub-floor surfaces. In commercial and industrial buildings, elaborate structures may be erected from channel elements in order to hold conduits that distribute water, steam, gasses, and electricity throughout a building or plant. Channels are commercially available and most commonly known as Kindorf$^R$, manufactured by the Thomas and Betts Company of Memphis, Tenn., and B-Line Systems, Inc. of Highland, Ill. The channels are usually fabricated from steel ranging from 12 gauge to 5/64 inch thickness and have a "C" shaped extruded configuration comprised of a back panel and side panels defining an open extremity. The side panels generally have inwardly facing retaining shoulders adapted to slideably retain pendant objects.

Most channels have a uniformly spaced and aligned pattern of apertures in each of the three panel portions in order to provide bolting points as well as to reduce the weight of the channel. In some brands of channel, Kindorf in particular, these apertures are of circular configuration and of 9/16 inch diameter punched on 1 1/2 inch centers. Often it is desirable to attach electrical junction boxes, fixtures or other components to the underside of a suspended channel. It is commonplace for tradesman to bolt sections of channel in back-to-back fashion in order to dispose a section of channel with a downwardly facing open extremity to receive fastening means in the form of bolts whose heads are slideably retained within the open extremity. It would be desirable to have alternative fastener means interactive with the apertured back panel of a single suspended channel, especially an internally threaded fastener useful for holding pendant objects.

Numerous threaded adapters and bushings have been disclosed in the prior art. Various fasteners have been employed in attempts to provide an engageable bore for fasteners having self-tapping and machine threads. Threaded bushings possessing a self-tapping male thread are usually manufactured from metals such as steel, bronze, or brass, and serve to fasten screws, bolts or similar connecting elements within or to structural members or work pieces having a lesser hardness than the bushing. Typical work pieces may, for example, be soft steel, iron, wood, plastics, light metals and the like. It is the purpose of such threaded bushings, also called liners or anchors, to create within a relatively soft work piece an internal thread possessing relatively great strength. This strength is attained primarily by a thread having a substantially greater diameter relative to the internal thread diameter of the bushing.

U.S. Pat. Nos. 3,866,509 to Kraus, et. al.; 2,455,885 to Theurer; and 3,866,510 to Eibes each disclose self-tapping threaded screw inserts in the form of externally threaded tubular sleeves having various means for cutting threads into a receiving bore as the insert is rotated therein. Each of these inserts have internal machine threads coaxially disposed to the external self-tapping threads. The Theurer patent teaches the additional principle of utilizing the expansive force generated upon the internal threads by a received fastener to provide additional gripping strength. Each of these inserts is adapted primarily for insertion into a bore of equal or greater length than that of the insert.

Anchoring inserts such as those used on drywall gypsum boards are well known. U.S. Pat. Nos. 4,601,625 to Ernst, et al.; and 5,482,418 to Giannuzzi each disclose a self-drilling and self-threading anchor for use in drywall. Each insert has a flanged head, oversized external self-tapping threads, and an internal passage adapted to receive a self-tapping screw or the like. As a screw is threaded into the interior bore of the anchor, expansive forces are transmitted to the coarse external threads and thereby create considerable gripping strength. These types of anchors are adapted to extend through the workpiece, and are not adapted or intended to receive a machine threaded fastener.

Although the aforementioned patents have self-tapping characteristics, they are adapted primarily to provide improved gripping strength in a relatively small bore, in relatively soft material.

It is accordingly an object of the present invention to provide a bushing having a self-threading external thread and internal machine thread.

It is another object of the present invention to provide a bushing as in the foregoing object capable of adapting a relatively small machine threaded fastening element within a relatively large diameter circular aperture in a workpiece.

It is a further object of this invention to provide a bushing of the aforesaid nature adapted to thread into a relatively hard and thin workpiece material.

It is still another object of this invention to provide a bushing of the aforesaid nature which does not rely upon expansive forces generated upon its internal threads in order to provide relatively great gripping strength.

It is yet another object of this invention to provide a bushing of the aforesaid nature which is easy to install and of simple, rugged construction amenable to low cost manufacture.

These objects and other objects and advantages of the invention will be apparent from the following description.

SUMMARY OF THE INVENTION

The above and other beneficial objects and advantages are accomplished in accordance with the present invention by a dually threaded adapter bushing of monolithic construction elongated upon a center axis between first and second extremities and further comprised of:

a) a head associated with said first extremity and having engaging means adapted to receive rotational force from a torque-producing tool, b) a shank portion extending between said head and said second extremity and having a continuous self-tapping helical male thread, and c) a bore centered upon said axis and having a female thread oriented in the same twist direction as said self-tapping thread and adapted to receive fastener means having a mating male thread.

In alternative embodiments, the threads may be of discontinuous nature and adapted to engage a workpiece by means of spiral or straight flutes, lobed threads or cut-away sections of threads.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a greatly enlarged side view of an embodiment of the adapter bushing of the present invention.

FIG. 2 is a sectional view taken in the direction of the arrows upon the line 2—2 of FIG. 1.

FIG. 3 is an end view taken from the top of FIG. 1.

FIG. 4 is an end view taken from the bottom of FIG. 1.

FIG. 5 is an enlarged fragmentary sectional view.

DESCRIPTION OF THE PREFERRED EMBODIMENT

Figure 6:
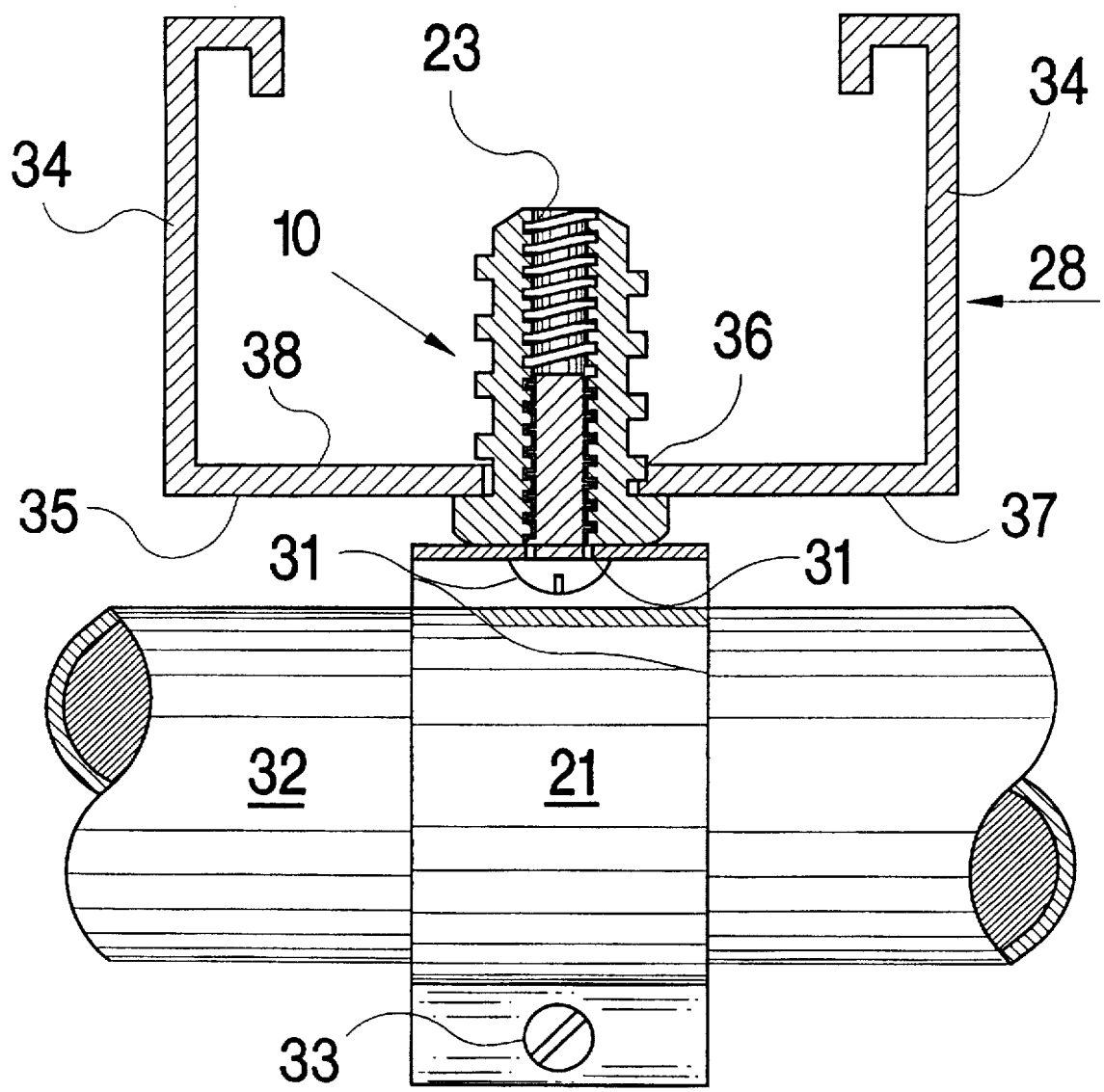
FIG. 6 is a vertical sectional view of the adapter bushing of FIG. 1 shown engaging a Kindorf channel and pendently securing a pipe.

Referring to FIGS. 1–6, an embodiment of the adapter bushing 10 of the present invention is shown as a monolithic structure elongated upon a center axis 11 between first and second extremities 12 and 13, respectively. Said second end extremity may be flat or conically tapered. A head 14, associated with said first extremity, is equipped with engaging means in the form of polygonal perimeter 15 for receiving torque from a suitable tool. Said perimeter may be 4, 6 or 8 sided. Alternative engaging means may be in the form of shaped recesses which may accommodate a screw driver or alan wrench. Head 14 is further characterized in having a flat inside shoulder 16 orthogonally disposed to axis 11 and adapted to abut against the Kindorf$^R$ channel.

A shank portion 17, extending between cap head 14 and second extremity 13, is provided with a continuous self-tapping helical male thread 18. The thread may be of the Acme type according to ANSI B18.6.6-1981 (R1991). The pitch of said male thread should be 4 to 8 turns/inches with a major diameter 19 between about ⅝ and ¹¹⁄₁₆ inch and a minor diameter 20 between ½ and ⁹⁄₁₆ inch. The ratio of major to minor diameter is preferably between 1.1 and 1.25. The ratio of pitch to minor diameter should be between 1.3 and 2. The ratio of length of the shank portion to the minor diameter is preferably between 1.0 and 1.5. In some embodiments, the thread is convergently tapered toward said second extremity either throughout the shank portion or just adjacent said second extremity.

Referring to FIG. 5, the opposite sidewalls 21 of thread 18 are flat and parallel, and extend radially between flat grooves 26 and flat lands 22. The width of the flat land 22 may vary between ³⁄₃₂ and ¹⁄₁₆ inch.

A circular cylindrical bore 23, centered upon axis 11 and extending the entire length of the bushing, is provided with internal female thread 24. Said female thread may be of standard National Coarse or Fine threads, as defined in ANSI B18.6.3-1972, R1991, and may extend the entire length of bore 23 of just part way, beginning from cap head 14.

By virtue of the critically selected criteria involved in its design, the adapter bushing of the present invention is amenable to easy installation in a Kindorf$^R$ channel, and is capable of reliably holding harnesses for supporting heavy loads. For example, as shown in FIG. 6, a Kindorf$^R$ channel 28 of C-shaped cross section having side panels 34 joined by back panel 35, is engaged by an adapter bushing 10 of this invention which enters a sequenced circular aperture 36 in said back panel. Said back panel is bounded by interior and exterior surfaces 38 and 39, respectively. Said bushing threadably engages aperture 36 in a manner whereby the flat inside shoulder 16 of the bushing abuts against said exterior surface 39. Clevis style pipe strap 29 is secured to said bushing by way of threaded bolt 30 which penetrates hole 31 in said pipe strap and threadably engages cylindrical bore 23. A pipe 32 of conventional design is held within pipe strap 29 in perpendicular juxtaposition to channel 28 and secured by way of retainer bolt 33.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A dually threaded adapter bushing of monolithic construction elongated upon a center axis between first and second extremities and further comprised of:
   a) a head associated with said first extremity and having a flat inside shoulder and engaging means in the form of a polygonal perimeter adapted to receive rotational force from a torque-producing tool,
   b) a shank portion extending between said head and said second extremity and having a continuous self-tapping helical male thread comprised of opposed flat parallel sidewalls which extend radially with respect to said center axis between flat grooves and flat lands, and
   c) a bore centered upon said axis and having a female thread oriented in the same twist direction as said self-tapping thread and adapted to receive fastener means having a mating male thread.

2. In combination, an elongate structural channel of C-shaped cross-section defined by opposed parallel side panels joined by a back panel defined by interior and exterior surfaces and having a series of uniformly shaped identical circular apertures, and adapter bushings of claim 1 threadably engaging said circular apertures in a manner whereby said flat inside shoulder abuts against the exterior surface of said back panel.

3. A dually threaded adapter bushing of monolithic construction elongated upon a center axis between first and second extremities and further comprised of:
   a) a head associated with said extremity and having a polygonal perimeter and flat inside shoulder,
   b) a shank portion extending between said inside shoulder and said second extremity and having a continuous self-tapping helical male thread having major and minor diameters, the ratio of said major to minor diameter between 1.1 and 1.25, and
   c) a bore centered upon said axis and having a female thread oriented in the same twist direction as said self-tapping thread and adapted to receive fastener means having a mating male thread.

4. The adapter bushing of claim 3 wherein said helical male thread has a pitch of 7 to 9 turns per inch, and wherein the ratio of the length of said shank portion to said minor diameter is between 1.0 and 1.5.

* * * * *